(12) United States Patent
Wang et al.

(10) Patent No.: US 11,563,484 B2
(45) Date of Patent: Jan. 24, 2023

(54) UPLINK FREQUENCY AND TIMING COMPENSATION IN A NON-TERRESTRIAL NETWORK

(71) Applicant: QUALCOMM Incorporated, San Diego, CA (US)

(72) Inventors: Xiao Feng Wang, San Diego, CA (US); Jun Ma, San Diego, CA (US); Qiang Wu, San Diego, CA (US); Huilin Xu, San Diego, CA (US); Iyab Issam Sakhnini, San Diego, CA (US); Dan Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 14 days.

(21) Appl. No.: 16/805,472

(22) Filed: Feb. 28, 2020

(65) Prior Publication Data

US 2021/0273719 A1 Sep. 2, 2021

(51) Int. Cl.
*H04W 68/00* (2009.01)
*H04B 7/185* (2006.01)
*H04W 56/00* (2009.01)

(52) U.S. Cl.
CPC .... *H04B 7/18513* (2013.01); *H04W 56/0005* (2013.01)

(58) Field of Classification Search
CPC . H04W 72/042; H04W 56/00; H04W 74/004; H04W 72/1284; H04W 74/0891
See application file for complete search history.

(56) References Cited

U.S. PATENT DOCUMENTS

| 8,538,327 B2* | 9/2013 | Sayeed | H04B 7/18589 455/13.2 |
|---|---|---|---|
| 2008/0159419 A1* | 7/2008 | Smith | H04W 56/0045 375/260 |
| 2011/0256865 A1 | 10/2011 | Sayeed et al. | |
| 2018/0254825 A1* | 9/2018 | Speidel | H04B 7/2123 |
| 2019/0261251 A1* | 8/2019 | Lindheimer | H04W 48/16 |
| 2019/0313357 A1 | 10/2019 | Wang et al. | |
| 2019/0349077 A1* | 11/2019 | Alasti | H04B 7/18513 |
| 2019/0349877 A1* | 11/2019 | Alasti | H04B 7/18513 |
| 2020/0178135 A1 | 6/2020 | Yun et al. | |
| 2020/0274814 A1* | 8/2020 | Li | H04W 40/20 |

FOREIGN PATENT DOCUMENTS

WO 2019217029 A1 11/2019

OTHER PUBLICATIONS

International Search Report and Written Opinion received in Patent Cooperation Treaty Application No. PCT/US2021/018478, ISA/EPO, dated Jun. 4, 2021.

\* cited by examiner

*Primary Examiner* — Khalid W Shaheed
(74) *Attorney, Agent, or Firm* — Haynes and Boone, LLP (57) ABSTRACT

A non-terrestrial network is provided that includes a satellite that transmits an orbital parameter message to a user equipment. The user equipment processes the orbital parameter message to determine a current range from the user equipment to the satellite based upon the received orbital parameter message, a timing offset and a frequency offset for an uplink transmission to the satellite.

24 Claims, 5 Drawing Sheets

UPLINK FREQUENCY AND TIMING COMPENSATION IN A NON-TERRESTRIAL NETWORK

TECHNICAL FIELD

This application relates to wireless communication systems, and more particularly the uplink frequency and timing compensation in a non-terrestrial network.

INTRODUCTION

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

To expand network access, it is proposed to develop non-terrestrial networks for 5G, which may utilize satellites or high-altitude platforms as relay devices in wireless communication. In such non-terrestrial networks, the propagation delay of wireless transmissions between a ground terminal such as a user equipment (UE) and a satellite may be relatively large as compared to terrestrial wireless network transmissions. An uplink (UL) transmission from a UE to a satellite that was transmitted in an assigned time slot may thus be received by the satellite in a different time slot due to the relatively-large propagation delay. Moreover, the relatively-high speed of the low-earth-orbit (LEO) satellites introduces a significant doppler shift in the UL transmission.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication for a user equipment (UE) is provided that includes: receiving an orbital parameter message from a satellite; determining a current range from the UE to the satellite based upon the received orbital parameter message; determining an adjusted uplink timing for an uplink transmission responsive to the current range; and transmitting the uplink transmission to the satellite according to the adjusted uplink timing.

In an additional aspect of the disclosure, a user equipment is provided that includes: a processor configured to: process an orbital parameter message from a satellite to derive a current range to the satellite; and determine a timing offset responsive to the current range; and a transceiver configured to receive the orbital parameter message from the satellite and to transmit an uplink message to the satellite according to the timing offset.

In yet another aspect of the disclosure, a method for a satellite is provided that includes: receiving an orbital parameter request from a user equipment; and transmitting a system information block for a set of orbital parameters to the user equipment responsive to the orbital parameter request.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communication systems, also referred to as wireless communication networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communication (GSM) networks, 5$^{th}$ Generation (5G) or new radio (NR) networks, as well as other communication networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of the universal mobile telecommunication system (UNITS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunication associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (III); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs allows transmissions to start on symbol boundaries. 5G NR also contemplates a self-contained integrated subframe design with uplink (UL)/downlink scheduling information, data, and acknowledgement in the same subframe. The self-contained integrated subframe supports communication in unlicensed or contention-based shared spectrum, adaptive UL/downlink that may be flexibly configured on a per-cell basis to dynamically switch between UL and downlink to meet the current traffic needs Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer.

Before communicating in a terrestrial wireless network, a UE establishes a connection with a base station (BS) through an initial access procedure. This initial access procedure involves cell search and selection, where the UE obtains system information associated with the network. In an NR network, the BS sequentially transmits a synchronization signal block (SSB). Each SSB may include a primary synchronization signal (PSS), a secondary synchronization signal (SSS), and a physical broadcast channel (PBCH) carrying system information.

This connection process is more challenging in a non-terrestrial network in which a satellite functions as a relay node between the UE and the BS. Alternatively, the satellite itself may function as the BS in a non-terrestrial network. The satellite may sequentially transmit SSBs as discussed above for a BS. Once a UE has established connection with a satellite, the UL transmissions from the UE to the satellite are assigned to certain time slots and to certain subcarriers. But the propagation delay and the Doppler shift for the UL transmissions affect these assignments. One way to eliminate the Doppler shift is to utilize geo-stationary orbits for the satellites. But to be geo-stationary forces the satellite to be in an equatorial orbit that is relatively remote (e.g., more than 22,000 miles) from sea level. The resulting roundtrip propagation delay between the UE and such a geostationary satellite is unacceptably high for effective wireless communication. It is thus proposed that a 5G non-terrestrial network will instead be built using a constellation of low-earth-orbit (LEO) satellites. The one-hop propagation delay (either in UL or DL) to a LEO satellite ranges from around 4 to 8 milliseconds depending upon the satellite's elevation from sea level. In contrast, the one-hop propagation delay for a geostationary satellite is approximately 270 milliseconds or greater.

Although LEO satellites have more manageable propagation delays, a LEO satellite must travel at a relatively high speed (e.g., several kilometers per second) to maintain a stable orbit. An uplink transmission from a UE to a LEO satellite will thus be subjected to a significant Doppler shift. Without any compensation, an UL transmission from a UE to an LEO satellite that was transmitted over an assigned set of subcarriers may thus be received by the LEO satellite on shifted frequencies, resulting in interference at the LEO satellite. Similarly, an UL transmission from a UE to an LEO satellite that was transmitted over an assigned time slot may arrive at the LEO satellite over a different time slot due to the propagation delay. It is thus proposed that a UE in a non-terrestrial network will compensate for the Doppler shift by transmitting on an offset set of subcarriers so that when received by the LEO satellite, the offset set of subcarriers are shifted by the Doppler shift to the assigned set of subcarriers that are expected by the LEO satellite. Similarly, the UE may adjust the UL timing so that the UL transmission is received in the expected time slot at the LEO satellite and does not interfere with transmissions in adjacent time slots. In the following discussion, an LEO satellite will be referred to simply as a satellite for brevity.

Based upon the expected Doppler shift and propagation delay, the UE can thus adjust the frequency shift and delay given to the UL transmissions accordingly. To calculate the expected Doppler shift and propagation delay, the UE may use the position and velocity of the satellite relative to a stationary ground-based reference system. This trajectory information is traditionally referred to as satellite ephemeris and requires at least six parameters. For example, in a Cartesian coordinate system, the satellite ephemeris would consist of an x, y, and z location of the satellite and the x, y, and z components of the satellite velocity. If each parameter is represented with six bits of precision, the ephemeris of a satellite requires sixty-four bits. During the initial access procedure, the satellite could thus transmit its ephemeris to a UE in a sixty-four-bit message. But note that the Doppler shift to the satellite and its range (and thus the propagation delay) will rapidly change due to the several kilometers per second velocity of the satellite. A satellite must thus continually refresh its ephemeris through updated messages to the UE. The resulting ephemeris messages would thus occupy a significant amount of the available DL bandwidth.

To alleviate this congestion, it is proposed herein that the satellite transmits orbital parameters instead of the six parameters necessary to specify its location and velocity. For example, the satellite may transmit Kepler parameters that specify its orbit. Alternatively, the satellite may transmit a compressed version of the satellite ephemeris to the UE. The UE then integrates using the orbital parameters to derive the six parameters that would otherwise need to be transmitted regularly by the satellite. Not only are the orbital parameters more compact, note that a UE may then integrate using the orbital parameters to obtain an accurate estimate of the satellite position and velocity for a period of validity for the orbital parameters. The user equipment thus needs no further receipt of any additional ephemeris during the period of validity. The period of validity depends upon the particular orbital model as will be explained further herein.

Figure 1:
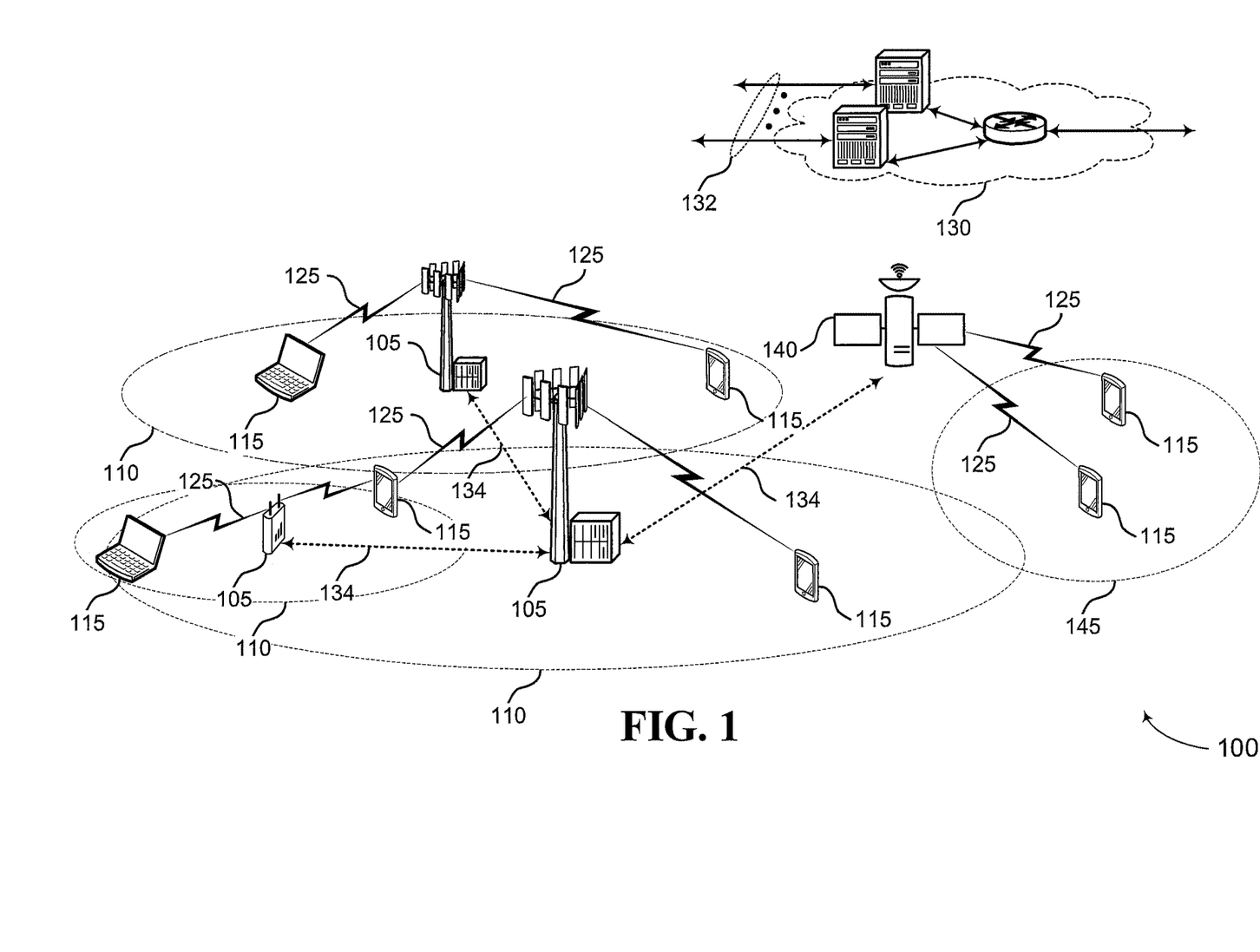
FIG. 1 illustrates both a terrestrial network and a non-terrestrial network according to some aspects of the present disclosure.

FIG. 1 illustrates an example of a wireless communication system 100 that supports orbital parameter messages for a non-terrestrial network. The wireless communication system 100 includes base stations 105, UEs 115, and a core network 130. In some examples, the wireless communication system 100 may be a Long Term Evolution (LTE) network, an LTE-Advanced (LIE-A) network, an LTE-A Pro network, or a New Radio (NR) network. In some examples, the wireless communication system 100 may support enhanced broadband communication, ultra-reliable (e.g., mission critical) communication, low latency communication, or communication with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, aHome eNodeB, or some other suitable terminology. Wireless communication system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communication with various UEs 115 is supported. Each base station 105 may provide communication coverage for a respective geographic coverage area 110 via communication links 125, which may utilize one or more carriers. Communication links 125 shown in wireless communication system 100 may include uplink transmissions from a UE 115 to a base station 105, or downlink transmissions from a base station 105 to a UE 115. Downlink transmissions may also be called forward link transmissions whereas uplink transmissions may also be called reverse link transmissions.

The geographic coverage area 110 for a base station 105 may be divided into sectors each making up a portion of the geographic coverage area 110, and each sector may be associated with a cell. For example, each base station 105 may provide communication coverage for a macrocell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap and overlapping geographic coverage areas 110 associated with different technologies may be supported by the same base station 105 or by different base stations 105. The wireless communication system 100 may include, for example, a heterogeneous LTE/LTE-A/LTE-A Pro or NR network in which different types of base stations 105 provide coverage for various geographic coverage areas 110.

Geographic coverage areas 110 are part of a terrestrial network. But some UEs 115 may be remote from geographic coverage areas 110. To serve these remote UEs 115, a constellation of satellites such as a satellite 140 each projects a beam footprint 145 that supports communication with various UEs 115 within the beam footprint. Each satellite 140 may provide communication coverage for a respective beam footprint 145 via communication links 125, and communication links 125 between a satellite 140 and a UE 115 may utilize one or more carriers.

Communication links 125 shown in wireless communication system 100 may include uplink transmissions from a UE 115 to a satellite 140, or downlink transmissions from a satellite 140 to a UE 115. In some embodiments, satellite 140 has a backhaul connection 134 with a base station 105 such that satellite 140 functions as a relay station between its UEs 115 and the corresponding base station 105. In other embodiments, satellite 140 itself functions as a base station 105.

The term "cell" refers to a logical communication entity used for communication with a base station 105 (e.g., over a carrier) or a satellite beam, and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrow band Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communication system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or the like, which may be implemented in various articles such as appliances, vehicles, meters, or the like.

Some UEs 115 may be configured to employ operating modes that reduce power consumption, such as half-duplex communication (e.g., a mode that supports one-way communication via transmission or reception, but not transmission and reception simultaneously). In some examples, half-duplex communication may be performed at a reduced peak rate. Other power conservation techniques for UEs 115 include entering a power saving "deep sleep" mode when not engaging in active communication, or operating over a limited bandwidth (e.g., according to narrowband communication). In some examples, UEs 115 may be designed to support critical functions (e.g., mission critical functions), and a wireless communication system 100 may be configured to provide ultra-reliable communication for these functions.

In some examples, a UE 115 may also be able to communicate directly with other UEs 115 (e.g., using a peer-to-peer (P2P) or device-to-device (D2D) protocol). One or more of a group of UEs 115 utilizing D2D communication may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communication may utilize a one-to-many (1:M) system in which each UE 115 transmits to every other UE 115 in the group. In some cases, a base station 105 facilitates the scheduling of resources for D2D communication. In other cases, D2D communication are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interfaces). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communication system 100 may operate using one or more frequency bands, typically in the range of 300 MHz to 300 GHz. Generally, the region from 300 MHz to 3 GHz is known as the ultra-high frequency(UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves maybe associated with smaller antennas and shorter range (e.g., less than 100 km) compared to transmission using the smaller frequencies and longer waves of the high frequency (HF) or very high frequency (VHF) portion of the spectrum below 300 MHz.

Wireless communication system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communication system 100 may also operate in an extremely high frequency (EHF) region of the spectrum (e.g., from 30 GHz to 300 GHz), also known as the millimeter band. In some examples, wireless communication system 100 may support millimeter wave (mmW) communication between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

Wireless communication system 100 may utilize both licensed and unlicensed radio frequency spectrum bands. For example, wireless communication system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downstream transmissions, upstream transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communication, or beamforming. For example, wireless communication system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communication may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, satellite 140, or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, wireless communication system 100 may be a packet-based network that operate according to a layered protocol stack. In the user plane, communication at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Time intervals in LTE or NR may be expressed in multiples of a basic time unit, which may, for example, refer to a sampling period of $T_s=1/30,720,000$ seconds. Time intervals of a communication resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix (CP) prepended to each symbol period). Excluding the cyclic prefix, each symbol period may contain 2048 sampling periods. In some cases, a subframe may be the smallest scheduling unit of the wireless communication system 100 and may be referred to as a transmission time interval (TTI). In other cases, a smallest scheduling unit of the wireless communication system 100 may be shorter than a subframe or may be dynamically selected (e.g., in bursts of shortened TTIs (sTTIs) or in selected component carriers using sTTIs).

In some implementations, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communication systems may implement slot aggregation in which multiple slots or mini-slots are aggregated together and used for communication between a UE 115 and a base station 105 or a satellite 140.

Various aspects of the present disclosure will be described with reference to an OFDM waveform, schematically illustrated in FIG. 2. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration (e.g., 10 ms) for wireless transmissions, with each frame consisting of 10 subframes of, for example, 1 ms each. On a given carrier, there may be one set of frames in the UL, and another set of frames in the DL. An expanded view of an exemplary DL subframe 202 is also illustrated in FIG. 2, showing an OFDM resource grid 204. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 204 may be used to schematically represent time-frequency resources for a given antenna port. That is, in a MIMO implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 208 entirely corresponds to a single direction of communication (either transmission or reception for a given device). A set of contiguous RBs 208 such as shown for resource grid 204 form a bandwidth part (BWP).

A UE generally utilizes only a subset of the resource grid 204. An RB may be the smallest unit of resources that can be allocated to a UE. Thus, the more RBs scheduled for a UE, and the higher the modulation scheme chosen for the air interface, the higher the data rate for the UE. In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 210 illustrates the slot 210 including a control region 212 and a data region 214. In general, the control region 212 may carry control channels (e.g., PDCCH), and the data region 214 may carry data channels (e.g., PDSCH or PUSCH). Of course, a slot may contain all DL, all UL, or at least one DL portion and at least one UL portion. The simple structure illustrated in FIG. 2 is merely exemplary in nature, and different slot structures may be utilized, and may include one or more of each of the control region(s) and data region(s).

Figure 2:
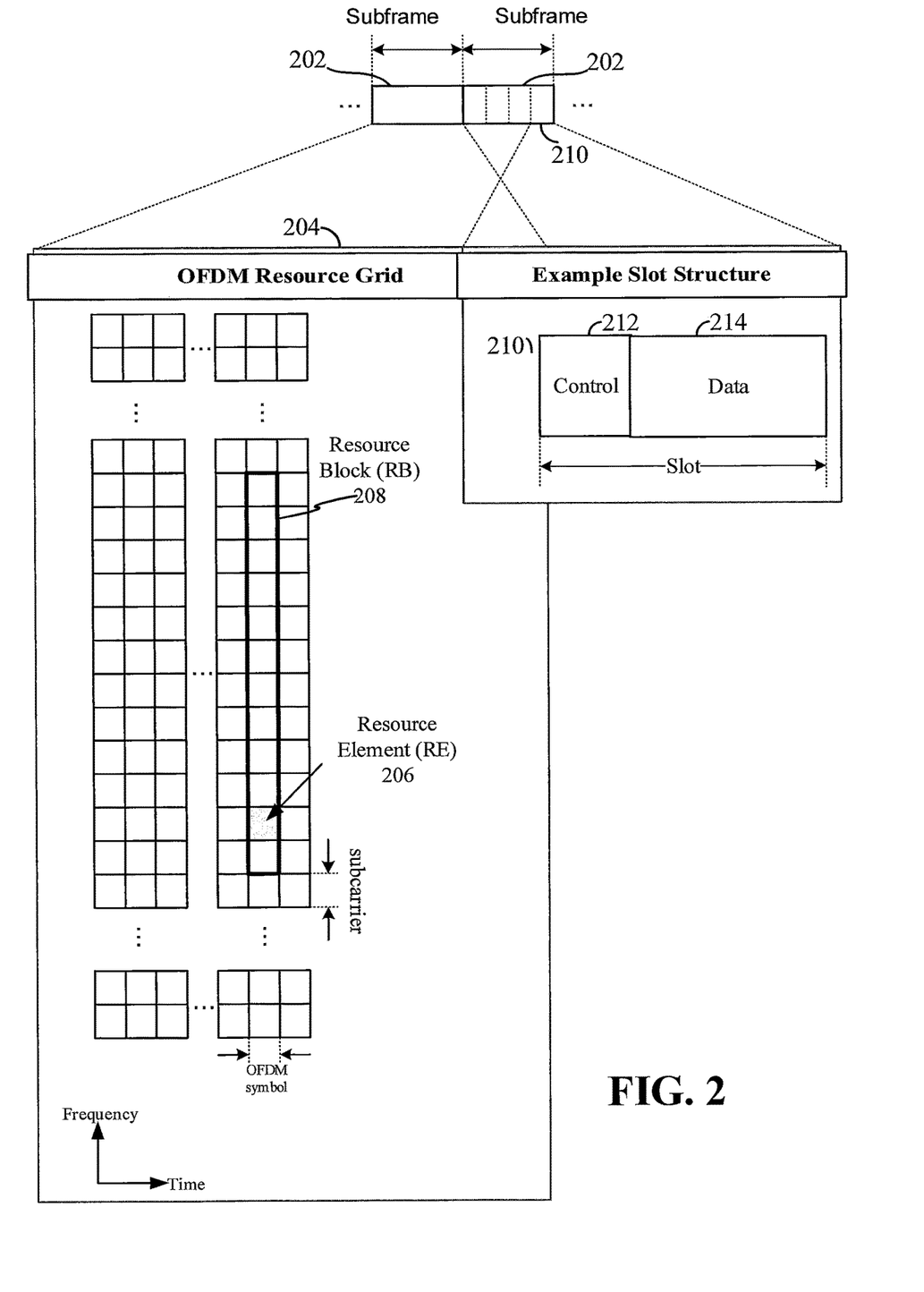
FIG. 2. is a schematic illustration of an organization of wireless resources in an air interface utilizing orthogonal frequency divisional multiplexing (OFDM) for the networks of FIG. 1.

Although not illustrated in FIG. 2, the various REs 206 within a RB 208 may be scheduled to carry one or more physical channels, including control channels, shared channels, data channels, etc. Other REs 206 within the RB 208 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 208.

In a DL transmission, the transmitting device (e.g., satellite 140) may allocate one or more REs 206 (e.g., within a control region 212) to carry DL control information including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more UEs 115. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, each UE 115 may utilize one or more REs 206 to carry UL control information including one or more UL control channels, such as a physical uplink control channel (PUCCH), to satellite 140 or base station 105. UL control information may include a variety of packet types and categories, including pilots, reference signals, and information configured to enable or assist in decoding uplink data transmissions.

In addition to control information, one or more REs 206 (e.g., within the data region 214) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry system information blocks (SIBs), carrying information that may enable access to a given cell.

Referring again to FIG. 1, the term "carrier" refers to a set of radio frequency spectrum resources having a defined physical layer structure for supporting communication over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)) and may be positioned according to a channel raster for discovery by UEs 115. Carriers may be downstream or upstream (e.g., in an FDD mode), or be configured to carry downstream and upstream communication (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communication over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downstream carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth maybe referred to as a "system bandwidth" of the carrier or the wireless communication system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communication resource may refer to a combination of a radio frequency spectrum resource, a time resource, and a spatial resource (e.g., spatial layers), and the use of multiple spatial layers may further increase the data rate for communication with a UE 115

Upstream transmissions (e.g., CP-OFDM or DFT-S-OFDM waveforms) may arrive at a base station 105 or satellite 140 from a UE 115 within an interval time, for example, within a CP duration. For a subcarrier spacing of 120 kHz, the CP duration may be approximately 0.59 µs. Additionally, subcarrier spacing for mmW communication within the Ka band such as downstream transmissions between approximately 20 GHz and 30 GHz may be greater compared to upstream transmissions. For example, a subcarrier spacing greater than 120 kHz may improve communication reliability due to frequency error such as a result of Doppler. In this example, a subcarrier spacing greater than 120 kHz may result in a CP duration of 0.25 µs.

Having upstream transmissions in a network (e.g., a terrestrial network) arrive at a base station within the CP duration allows signals from different UEs to arrive while being orthogonal to each other. That is, signals from different UEs will not interfere with each other allowing each signal to arrive at the base station. However, these techniques that provide upstream timing control for terrestrial networks may be ineffective for non-terrestrial networks.

Referring again to satellite 140, the UL transmissions from UEs 115 within its footprint 145 may experience upstream timing errors (e.g., downstream timing tracking error, variation in propagation delay) that depend upon the range between these UEs 115 and satellite 140. Due to the low-earth orbit, this range is subject to a relatively large variation as satellite 140 orbits the earth. The upstream timing errors may thus have a correspondingly large variation. Similarly, the Doppler shift to the upstream transmissions from these UEs 115 will be significant due to the relatively-high velocity of satellite 140 relative to its UEs 115s. Upstream transmissions from the UEs 115 to satellite 140 that are assigned to certain time slots may arrive at satellite 140 with a delay that cannot be corrected by a cyclic prefix for those time slots. The upstream transmissions will thus cause inter-symbol interference in such cases. Similarly, the upstream transmissions that are assigned to certain subcarriers may arrive at satellite 140 on shifted frequencies, which can cause interference at the satellite 140.

To address these timing errors, it is proposed herein that satellite 140 periodically or aperiodically transmits an orbital parameter message to UEs 115 within its footprint 145. In some implementations, the orbital parameter message is a system information block (SIB) message. For example, satellite 140 may transmit system synchronization blocks (SSBs) that aid UEs 115 in connecting to satellite 140. Each SSB includes a physical broadcast channel (PBCH) that includes a master information block (MIB). The MIB identifies parameters so that each corresponding UE 115 in footprint 145 may acquire a first SIB (SIB1). The SIB1 contains information on the scheduling of other SIBs. In some implementations, SIB1 provides the scheduling information for an orbital-parameter-containing SIB (denoted herein as SIBX). The SIBX may be transmitted periodically or aperiodically. Alternatively, the scheduling information for the SIBX may be transmitted in each SSB.

In general, it takes a number of (e.g. 7) of orbital parameters to characterize the orbit of a satellite. To minimize the bandwidth needed for the SIBX transmission, the SIBX may be transmitted in a condensed or abbreviated form. For example, each UE 115 may be configured with the long-term orbital parameters for satellite 140. Such long-term orbital parameters are available in various satellite tracking databases. While a UE 115 is connected to a terrestrial cell 110 or (for example) has a WiFi connection to the internet, each UE 115 may be configured with the long-term orbital parameters of all the satellites in the constellation for the non-terrestrial network. Such long-term orbital parameters describe a satellite orbit that is valid (suitably accurate) for a certain validity period of time but as perturbations to the satellite's orbit accumulate over time, the satellite orbit described by the long-term orbital parameters becomes erroneous. The long-term orbital parameters then need updating to reflect the effect of the perturbations and more accurately describe the current orbit of satellite 140. In such implementations, the SIBX may comprise correctional orbital parameters that represent the difference between the long-term orbital parameters and current orbital parameters. Such a SIBX may also be denoted herein as an encoded SIBX to distinguish it from a SIBX that directly identifies the orbital parameters. Alternatively, the SIBX may contain compressed ephemeris information for satellite 140 such as derived from a fitting or prediction model to the raw ephemeris information.

As used herein, the term "current orbital parameters" refers to orbital parameters that describe the current orbit of satellite 140 with sufficient accuracy for the subsequent range and Doppler shift determination. Current orbital parameters may also be denoted herein as "short-term orbital parameters." When first generated, long-term orbital parameters function as current orbital parameters but become outdated as the effects of perturbations accumulate. A SIBX may thus represent the difference or correction between the short-term and long-term orbital parameters. By correcting the long-term orbital parameters according to the corrections within the SIBX, a UE 115 determines the short-term orbital parameters. A portion or all of the long-term and short-term orbital parameters may be represented using polynomial functions. Note that the configuration with long-term orbital parameters is advantageous for each UE 115 as the UE 115 will know prior to acquisition which of the satellites in the constellation for the non-terrestrial network are potentially visible. In addition, each UE 115 may use the long-term orbital parameters to aid in pointing the UL antennas as well as for setting acquisition and search windows. The long-term orbital parameters may be linked to the corresponding satellite 140 through a satellite identification (ID) number. Each UE 115 may also be denoted herein as a user terminal (UT).

Regardless of whether a UE 115 receives a SIBX in implementations without the long-term orbital parameter configuration or an encoded SIBX in implementations in which the UE 115 is configured with the long-term orbital parameters, the UE 115 may recover the short-term orbital parameters. With the short-term orbital parameters, the UE 115 may then numerically integrate using the short-term orbital parameters to calculate the satellite's position (and hence range from the UE 115) as well as the satellite's current velocity. For example, the UE 115 may use a system time such as a GPS time as part of the integration. The satellite position may be expressed as a vector (e.g., a Cartesian vector x, y, z) in an earth-centric and an earth-fixed coordinate system. The satellite position may also be expressed as a uni-length vector in such a coordinate system. From the range, the UE 115 may then utilize an appropriate amount of a negative time shift to its uplink transmissions. In other words, satellite 140 identifies the uplink time slot boundaries to each of its UEs 115. Based upon the range to satellite 140, each UE 115 may then transmit in advance of these time slot boundaries so that the uplink transmissions arrive at satellite 140 in their assigned time slots. Similarly, each UE 115 may use the satellite's current velocity to determine the Doppler shift that will be applied to its uplink transmissions. Each UE 115 may then adjust the frequencies of its uplink transmissions responsive to the expected Doppler shift so that satellite 140 receives the uplink transmissions on the expected subcarriers.

Rather than periodically transmit the SIBX or encoded SIBX messages, each UE 115 may transmit a SIB request for the SIBX transmission to the satellite 140 once the UE 115 is in a connected state with the satellite 140. In such non-periodic implementations, the satellite 140 may have an expanded search space for the receipt of the SIB request since the SIB request may not be received on the assigned time slots or assigned subcarriers due to the range delay and Doppler shift. Satellite 140 may then respond to the SIB request by transmitting the SIBX message (or the encoded SIBX message in implementations with long-term orbital parameter configurations). Once each UE 115 is configured with the short-term orbital parameters, the UE 115 may trigger a timer that times an ephemeris validity period. The ephemeris validity period is the period of time over which the short-term orbital parameters may be used to derive a sufficiently accurate orbit for the satellite 140. So long as its ephemeris validity period has not expired, each UE 115 may continue to use the short-term orbital parameters without transmitting another SIB request. In addition, the ephemeris validity period may be terminated if a UE 115 misses the reception of the SIBX, or a part of the SIBX.

Note that each SIBX message may contain not only the short-term orbital parameters for the transmitting satellite 140 but also the short-term orbital parameters for the adjacent satellites in the constellation (alternatively, the SIBX message may identify the short-term orbital parameters for all the satellites in the constellation). Similarly, an encoded SIBX may contain the correction parameters for the transmitting satellite 140 and also the correction parameters for adjacent satellites (or all the satellites) in the constellation. Note that a SIBX message may include both long-term and short-term orbital parameters. In that regard, a SIBX message may include a field that identifies the type of orbital parameters being transmitted by the SIBX message. For example, the field may indicate that the SIBX message contains only long-term orbital parameters. Alternatively, the field may indicate that the SIBX message contains only short-term orbital parameters or contains both long-term and short-term orbital parameters.

Figure 3:
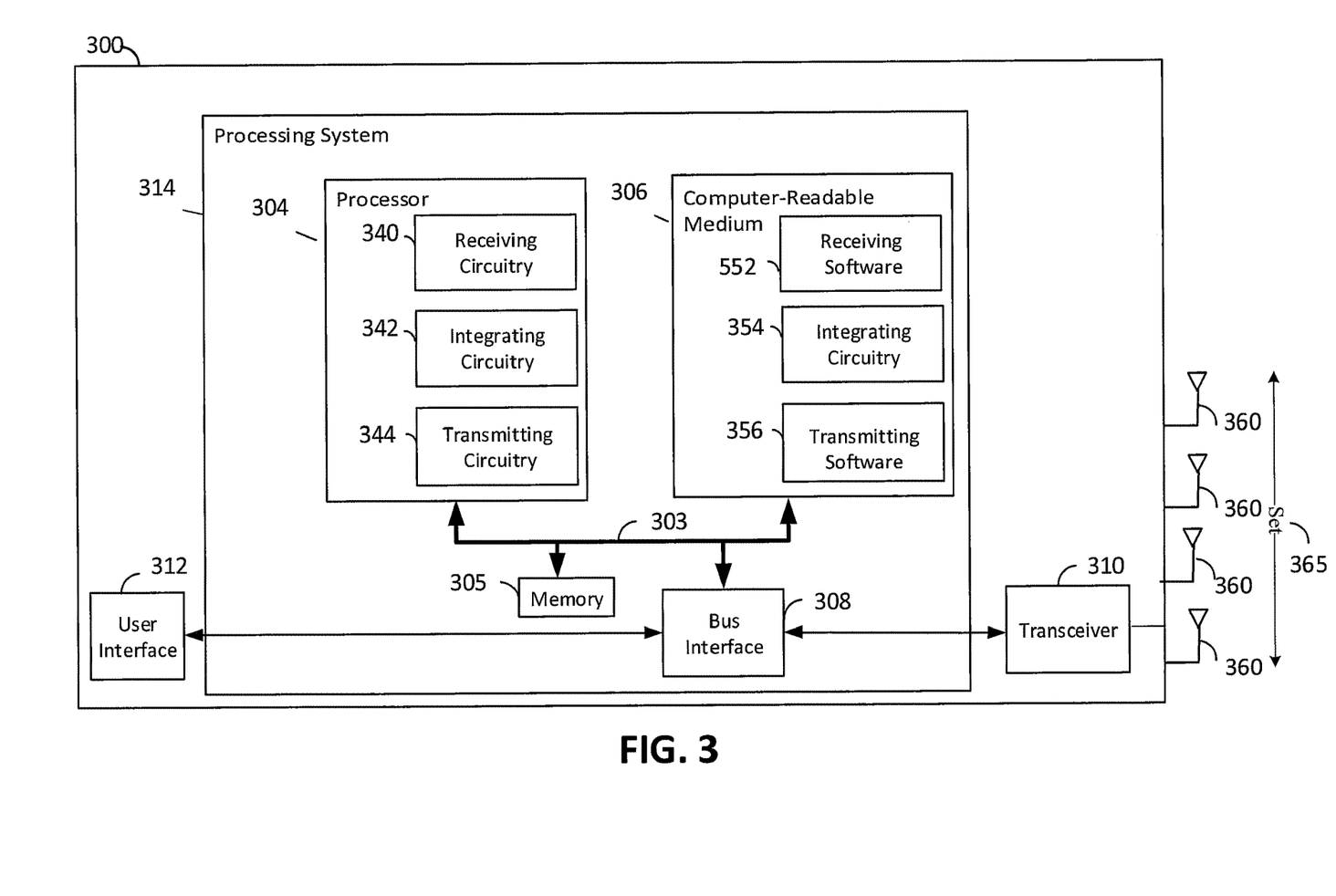
FIG. 3 is a block diagram of a user equipment in a non-terrestrial network in accordance with an aspect of the disclosure.

An example UE 300 is shown in FIG. 3 that includes a processing system 314 for controlling the timing adjustment and frequency adjustment as derived from a SIBX or encoded SIBX message. Processing system 314 includes a bus interface 308, a bus 302, memory 305, a processor 304, and a computer-readable medium 306. Furthermore, UE 300 may include a user interface 312 and a transceiver 310.

The processor 304 may include a receiving circuitry 340 configured for various functions, including, for example, to receive the SIBX or encoded SIBX message. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. As illustrated, the processor 304 may also include integration circuitry 342 configured to integrate using the short-term orbital parameters derived from the SIBX message to determine the range to satellite 140 and the velocity for satellite 140.

Various other aspects for UE 300 are also contemplated. For instance, it is contemplated that processor 304 include transmitting circuitry 344 configured to determine the appropriate timing advance and frequency shift for UL transmissions to satellite 140. Depending upon the configuration, transceiver 310 then transmits a time-shifted and frequency-shifted UL transmission to satellite 140 using one of more antennas 360 from a transmitting antenna set 365.

Processor 304 is also responsible for managing the bus 302 and general processing, including the execution of software stored on the computer-readable medium 306. The software, when executed by the processor 304, causes the processing system 314 to perform the various functions described below for any particular apparatus. The computer-readable medium 306 and the memory 305 may also be used for storing data that is manipulated by the processor 304 when executing software.

The bus 302 may include any number of interconnecting buses and bridges depending on the specific application of the processing system 314 and the overall design constraints. The bus 302 communicatively couples together various circuits including one or more processors (represented generally by the processor 304), the memory 305, and computer-readable media (represented generally by the computer-readable medium 306). The bus 302 may also link various other circuits such as timing sources, peripherals, voltage regulators, and power management circuits, which are well known in the art, and therefore, will not be described any further. The bus interface 308 provides an interface between the bus 302 and the transceiver 310. The transceiver 310 provides a communication interface or means for communicating with various other apparatus over a transmission medium. Depending upon the nature of the apparatus, a user interface 312 (e.g., keypad, display, speaker, microphone, joystick) may also be provided.

One or more processors 304 in the processing system 314 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 306, which may be a non-transitory computer-readable medium. The computer-readable medium 306 may reside in the processing system 314, external to the processing system 314, or distributed across multiple entities including the processing system 314.

In one or more examples, the computer-readable storage medium 306 may include receiving software 352 configured for various functions, including those performed by receiving circuitry 340. Similarly, integrating software 354 may be configured with the instructions for integrating circuitry 342 and transmitting software 356 may be configured with the instructions for transmitting circuitry 344.

Figure 4:
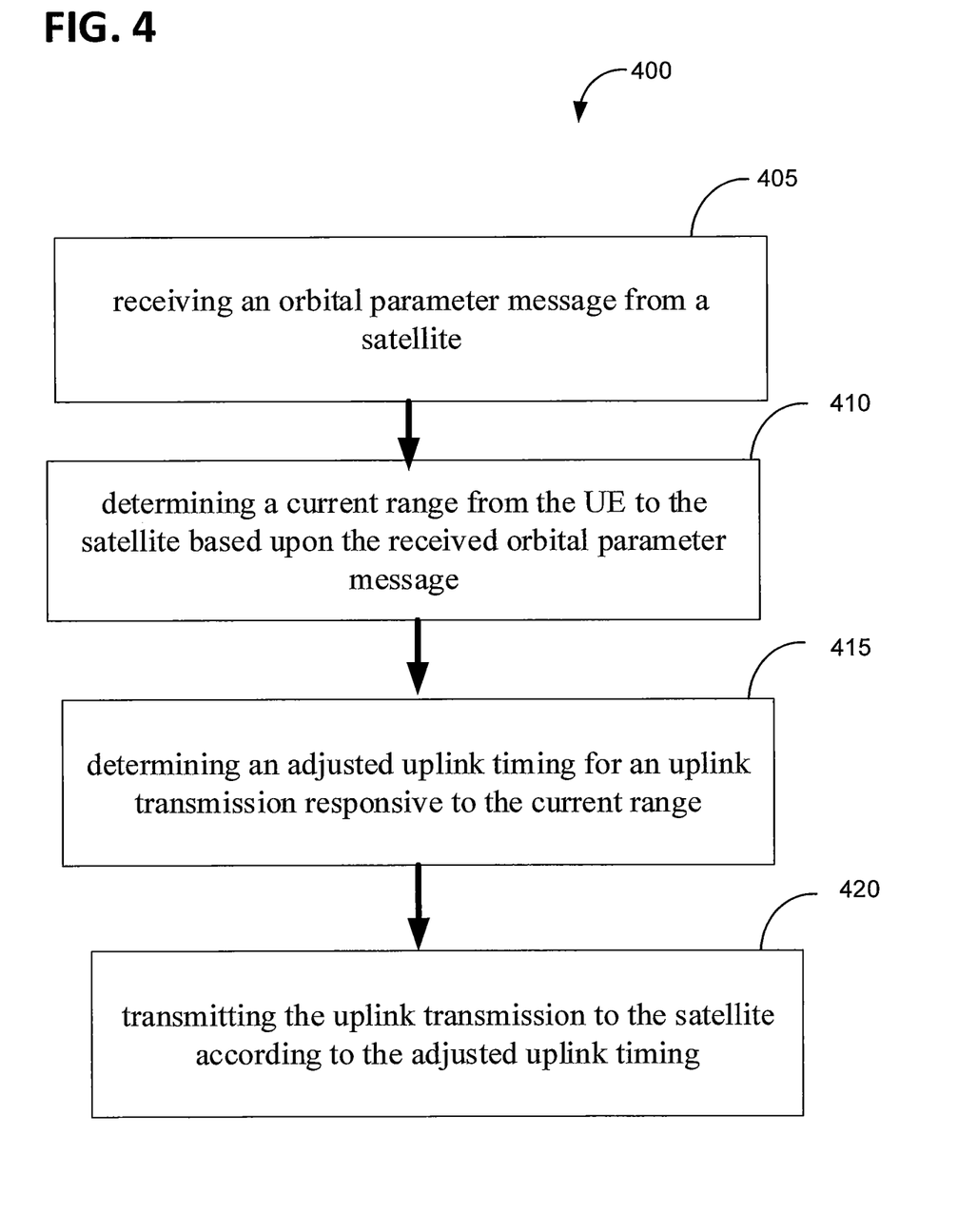
FIG. 4 is a flowchart for a method of operation for a user equipment in a non-terrestrial network in accordance with an aspect of the disclosure.

Of course, in the above examples, the circuitry included in the processor 304 is merely provided as an example, and other means for carrying out the described functions may be included within various aspects of the present disclosure, including but not limited to the instructions stored in the computer-readable storage medium 306, or any other suitable apparatus or means described herein, and utilizing, for example, the processes and/or algorithms described in relation to FIG. 4. In FIG. 4, a flow chart is provided, which illustrates an exemplary UL timing adaptation process 400 for performing some aspects of the disclosure. As described below, some or all illustrated features may be omitted in a particular implementation within the scope of the present disclosure, and some illustrated features may not be required for implementation of all embodiments. In some examples, the process 400 may be carried out by the UE 300 illustrated in FIG. 3. In some examples, the process 400 may be carried out by any suitable apparatus or means for carrying out the functions or algorithm described below.

Process 400 begins with an act 405 of receiving an orbital parameter message from a satellite. An example of act 405 would be the receipt of a SIBX. The process 400 further includes an act 410 of determining a current range from the UE to the satellite based upon the received orbital parameter message. An integration using short-term orbital parameters to determine a position for the satellite and thus a range between the satellite and the UE is an example of act 410. The process 400 also includes an act 415 of determining an adjusted uplink timing for an uplink transmission responsive to the current range. Referring again to FIG. 2, the adjustment of the timing for a time slot 210 is an example of act 415. Finally, the process 400 includes an act 420 of transmitting the uplink transmission to the satellite according to the adjusted uplink timing. The transmission of an adjusted slot 210 in an uplink transmission is an example of act 420. A frequency adaptation of the uplink transmission would be performed analogously.

Figure 5:
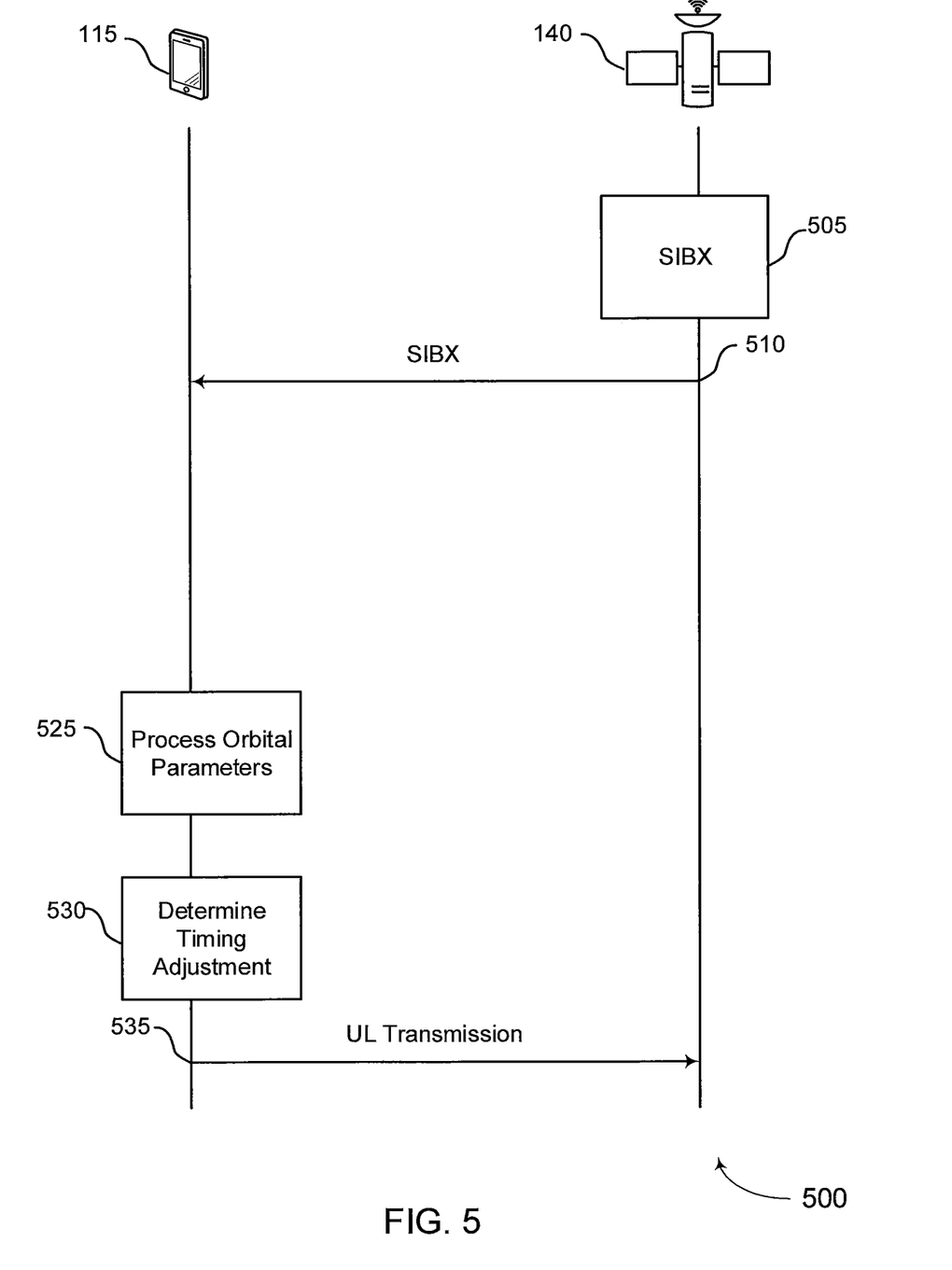
FIG. 5 illustrates an example process flow between a satellite and a UE in accordance with an aspect of the disclosure.

FIG. 5 illustrates an example of a process flow 500 to transmit a SIBX message 505 from a satellite 140 to a UE 115 in accordance with aspects of the present disclosure. At a step 510, satellite 140 transmits a SIBX message 505 to UE 115. This transmission may be a periodic transmission or an aperiodic transmission such as in response to a SIB request from UE 115. In a step 525, UE 115 processes a set of orbital parameters derived from SIBX message 505 to determine a current range to satellite 140. Based upon the current range, UE 115 determines a timing adjustment in a step 530 that accounts for the propagation delay that a UL transmission will be subjected to in propagating from UE 115 over the current range to satellite 140. In a step 535, UE 115 transmits an UL transmission having a timing adjusted according to the timing adjustment. It will be appreciated that UE 115 may also determine a Doppler shift for the UL transmission and adjust a frequency for the UL transmission as discussed herein.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication for a user equipment (UE), comprising:
   receiving a set of long-term orbital parameters for a satellite;
   receiving a system information block from the satellite, wherein the system information block identifies a set of correction parameters;
   deriving a set of short-term orbital parameters for the satellite from the set of long-term orbital parameters and the set of correction parameters;
   determining a current range from the UE to the satellite using the set of short-term orbital parameters;
   determining an adjusted uplink timing for an uplink transmission responsive to the current range; and
   transmitting the uplink transmission to the satellite according to the adjusted uplink timing.

2. The method of claim 1, wherein determining the current range comprises integrating over an orbital model defined by the set of short-term orbital parameters.

3. The method of claim 2, further comprising:
   determining a current velocity for the satellite from the set of short-term orbital parameters for the satellite; and
   adjusting a frequency of the uplink transmission responsive to the current velocity for the satellite.

4. The method of claim 1, further comprising:
   transmitting a system information block request to the satellite, wherein receiving the system information block is responsive to the system information block request.

5. The method of claim 1, wherein the system information block is a periodic system information block and includes an ID for the satellite.

6. The method of claim 1, wherein the system information block is an aperiodic system information block.

7. The method of claim 1, further comprising:
   adjusting a transmission direction for an at least one antenna in the UE responsive to the set of long-term orbital parameters.

8. The method of claim 1, wherein the set of long-term orbital parameters are Kepler parameters.

9. The method of claim 1, further comprising:
   integrating using the set of short-term orbital parameters to determine a current velocity for the satellite, and
   adjusting a frequency of the uplink transmission responsive to the current velocity for the satellite.

10. The method of claim 2, wherein the system information block further includes a set of orbital parameters for an additional satellite.

11. The method of claim 2, wherein the system information block further includes a set of orbital parameters for a plurality of additional satellites.

12. The method of claim 1, wherein the system information block includes compressed ephemeris information for the satellite.

13. The method of claim 1, further comprising:
   initiating a timer to time an ephemeris validity period responsive to the receipt of the system information block.

14. The method of claim 13, further comprising: requesting an additional system information block responsive to an expiration of the ephemeris validity period.

15. A user equipment, comprising:
   a processor configured to:
      derive a set of short-term orbital parameters from a set of long-term orbital parameters for a satellite and from a set of correction parameters;
      integrate using the set of short-term orbital parameters to determine a current range to the satellite; and
      determine a timing offset responsive to the current range; and
   a transceiver configured to receive a system information block from the satellite, wherein the system information block identifies the set of correction parameters, the transceiver being further configured to transmit an uplink message to the satellite according to the timing offset.

16. The user equipment of claim 15, wherein the processor is further configured to:
   integrate using the set of short-term orbital parameters to determine a current velocity for the satellite; and
   determine a frequency offset responsive to the current velocity for the satellite; wherein the transmitter is further configured to transmit the uplink message according to the frequency offset.

17. The user equipment of claim 15, wherein the processor is further configured to determine a timing for the system information block from a SIB1 message.

18. The user equipment of claim 17, wherein the timing for the system information block is a periodic timing.

19. The user equipment of claim 17, wherein the timing for the system information block is an aperiodic timing.

20. A user equipment, comprising:
   a processor configured to:
      integrate using a set of short-term orbital parameters to determine a current range to a satellite; and
      determine a timing offset responsive to the current range; and
   a transceiver configured to receive a system information block from the satellite, wherein the system information block identifies the set of short-term orbital parameters, the transceiver being further configured to transmit an uplink message to the satellite according to the timing offset.

21. The user equipment of claim 20, wherein the processor is further configured to:
   integrate using the set of short-term orbital parameters to determine a current velocity for the satellite; and
   determine a frequency offset responsive to the current velocity for the satellite; wherein the transmitter is further configured to transmit the uplink message according to the frequency offset.

22. The user equipment of claim 20, wherein the processor is further configured to determine a timing for the system information block from a SIB1 message.

23. The user equipment of claim 22, wherein the timing for the system information block is a periodic timing.

24. The user equipment of claim 22, wherein the timing for the system information block is an aperiodic timing.

* * * * *